(12) United States Patent
Graham et al.

(10) Patent No.: US 12,602,652 B2
(45) Date of Patent: Apr. 14, 2026

(54) SYSTEMS AND METHODS FOR CONTROLLING AND OPTIMIZING ORDER FULFILLMENT FROM A NETWORK OF FULFILLMENT CENTERS

(71) Applicant: CHEWY, INC., Plantation, FL (US)

(72) Inventors: Matthew Graham, Fort Lauderdale, FL (US); Branislav Cobanov, Aventura, FL (US); Brian Rakitin, Weston, FL (US)

(73) Assignee: CHEWY, INC., Plantation, FL (US)

( * ) Notice: Subject to any disclaimer, the term of this patent is extended or adjusted under 35 U.S.C. 154(b) by 0 days.

(21) Appl. No.: 18/549,120

(22) PCT Filed: Mar. 31, 2023

(86) PCT No.: PCT/US2023/065229
§ 371 (c)(1),
(2) Date: Sep. 5, 2023

(87) PCT Pub. No.: WO2023/193000
PCT Pub. Date: Oct. 5, 2023

(65) Prior Publication Data
US 2025/0021931 A1    Jan. 16, 2025

Related U.S. Application Data

(60) Provisional application No. 63/326,606, filed on Apr. 1, 2022.

(51) Int. Cl.
*G06Q 10/087* (2023.01)

(52) U.S. Cl.
CPC ................................. *G06Q 10/087* (2013.01)

(58) Field of Classification Search
None
See application file for complete search history.

(56) References Cited

U.S. PATENT DOCUMENTS 7,212,976 B2    5/2007    Scheer
7,668,761 B2    2/2010    Jenkins et al.
(Continued)

OTHER PUBLICATIONS

NPL_USPS_2011 from Google search with limitation before Apr. 1, 2022, file dated Jul. 24, 2011, also see file dated Jun. 7, 2013 on the same page. (Year: 2011).*

(Continued)

*Primary Examiner* — Florian M Zeender
*Assistant Examiner* — Kimberly S. Bursum
(74) *Attorney, Agent, or Firm* — Morgan, Lewis & Bockius LLP

(57) ABSTRACT
A system and method of controlling order fulfillment from a network of fulfillment centers are provided. The method includes receiving a batch of orders defined by either a threshold number of orders received or a predetermined period of time after a first order is received. The method also includes assembling a model based on the batch of orders. Each module in the model includes algorithms having fulfilment logic and variables based on constraints, external factors and routing objectives of the network. The method also includes receiving a model output including an allocated solution for each of the variables that is resolvable to shipping outcome for each order. The method also includes causing transmission of fulfillment data to each fulfillment center that comprises fulfillment instruction data for filling a complete order from the batch of orders, including identifying product, quantity, packaging instructions, and shipping instructions.

15 Claims, 10 Drawing Sheets

(56) References Cited

U.S. PATENT DOCUMENTS

| | | | |
|---|---|---|---|
| 7,987,107 B2 | 7/2011 | Wilson et al. | |
| 8,306,838 B2 | 11/2012 | Heise et al. | |
| 8,527,373 B1 | 9/2013 | Ricci et al. | |
| 9,213,953 B1 * | 12/2015 | Kassmann | G06Q 10/0631 |
| 10,109,004 B1 * | 10/2018 | Hawley | G06Q 10/06375 |
| 10,163,140 B2 | 12/2018 | Robinson et al. | |
| 10,572,854 B2 | 2/2020 | Johnson et al. | |
| 10,692,043 B1 | 6/2020 | Woodyard et al. | |
| 10,776,750 B2 | 9/2020 | Lindbo et al. | |
| 10,956,862 B2 | 3/2021 | Danelski | |
| 11,136,192 B2 | 10/2021 | Ahmann et al. | |
| 2002/0188499 A1 | 12/2002 | Jenkins | |
| 2003/0101107 A1 | 5/2003 | Agarwal et al. | |
| 2003/0177050 A1 | 9/2003 | Crampton et al. | |
| 2009/0271241 A1 * | 10/2009 | Pratt | G06Q 10/063 |
| | | | 705/7.11 |
| 2014/0012708 A1 | 1/2014 | Abdelhahman et al. | |
| 2015/0120599 A1 | 4/2015 | Deshpande et al. | |
| 2019/0114583 A1 | 4/2019 | Ripert et al. | |
| 2019/0354920 A1 | 11/2019 | Farias et al. | |
| 2022/0036305 A1 | 2/2022 | Glick et al. | |

OTHER PUBLICATIONS

International Search Report and Written Opinion for International Patent Applicaiton No. PCT/US2023/065229 dated Aug. 24, 2023, 7 pages.
Supplementary European Search Report dated Mar. 10, 2026 for European Patent Application No. 23782105.3, 7 pages.

* cited by examiner

Figure 3B:
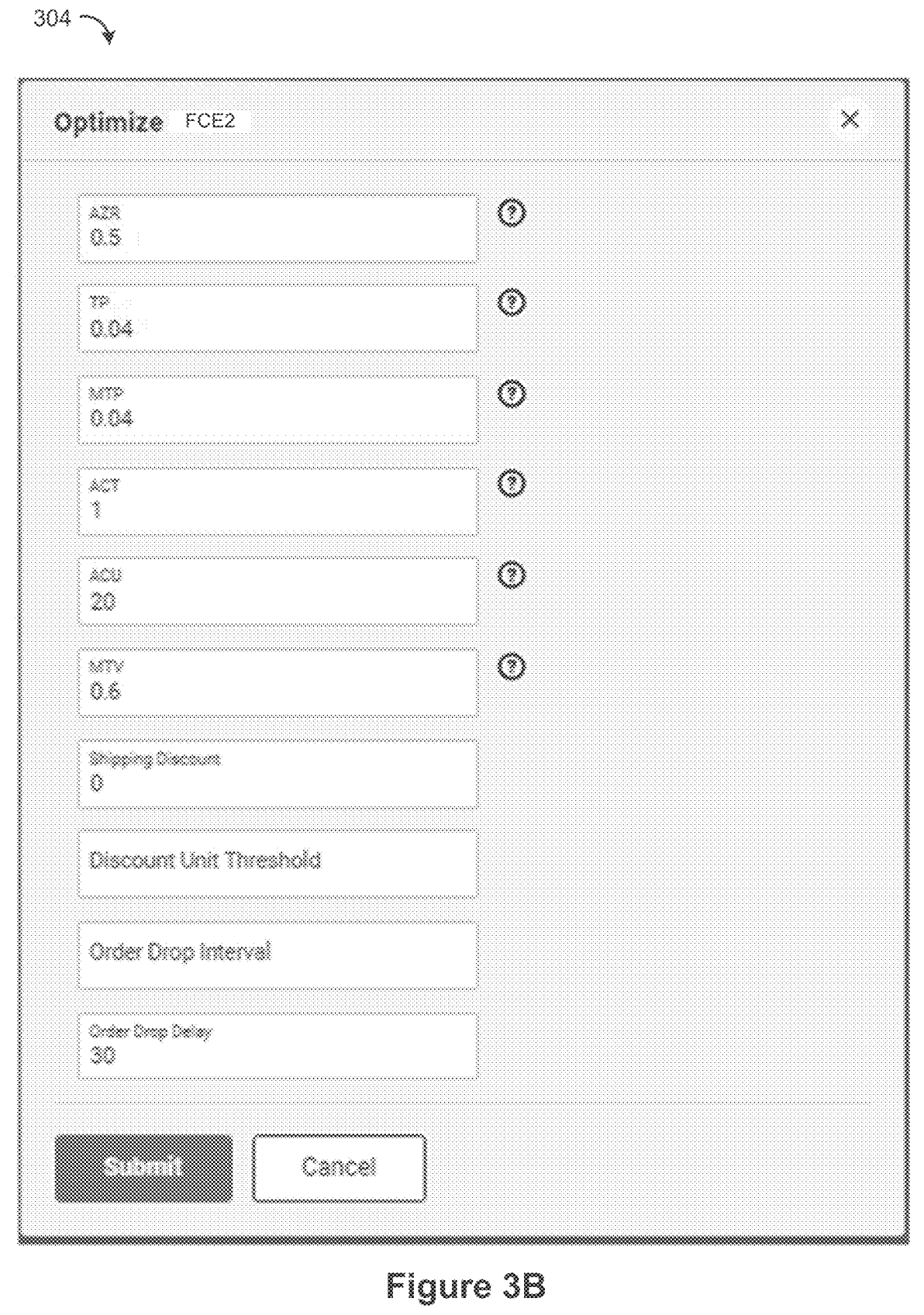

304

Optimize FCE2                                                    ✕

A2R
0.5                                                                 ⑦

TP...
0.04                                                                ⑦

MTP
0.04                                                                ⑦

ACT
1                                                                   ⑦

ACU
20                                                                  ⑦

MTV
0.6                                                                 ⑦

Shipping Discount
0

Discount Unit Threshold

Order Drop Interval

Order Drop Delay
30

[ Submit ]    [ Cancel ]

FC Config
Data Uploads
Configuration

PWL Rates Info — 502

Mode Surcharge Info — 504

DAS Info — 506

EDD AdjTNT & NextAdjTNT Info — 508

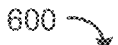

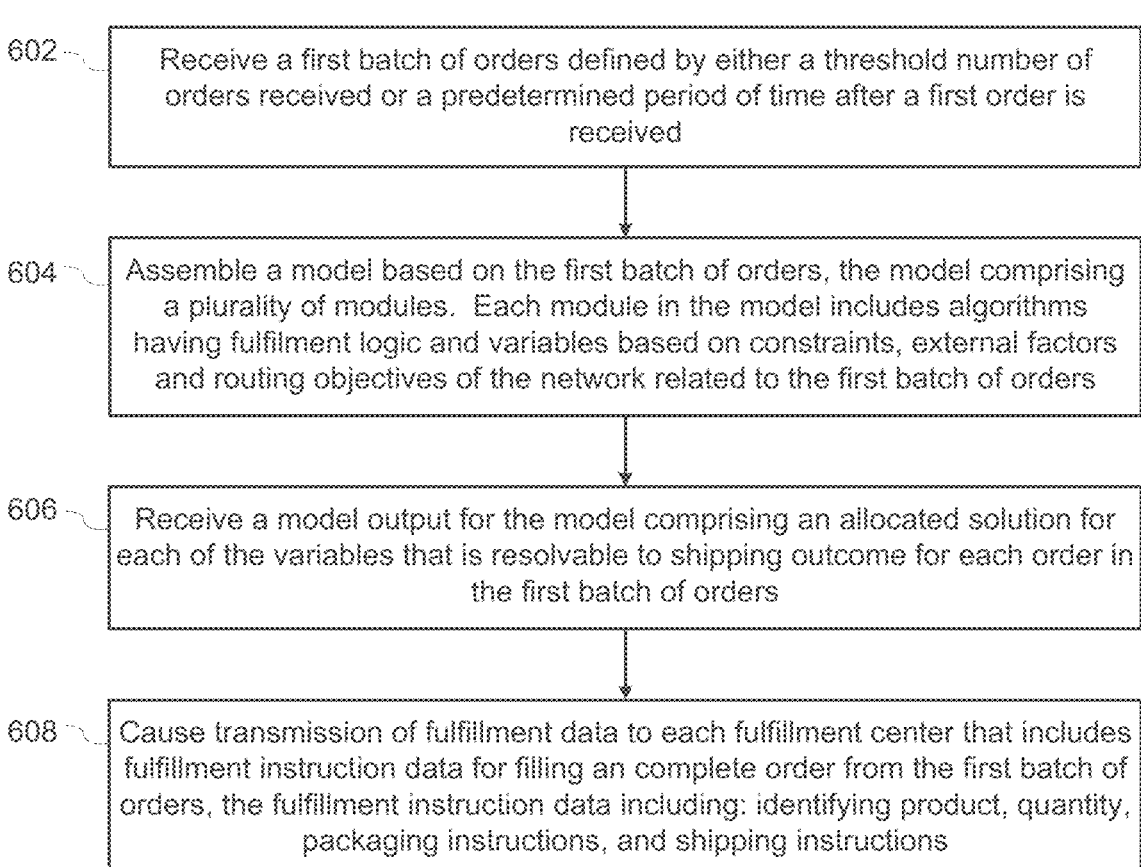

602 — Receive a first batch of orders defined by either a threshold number of orders received or a predetermined period of time after a first order is received 604 — Assemble a model based on the first batch of orders, the model comprising a plurality of modules. Each module in the model includes algorithms having fulfillment logic and variables based on constraints, external factors and routing objectives of the network related to the first batch of orders 606 — Receive a model output for the model comprising an allocated solution for each of the variables that is resolvable to shipping outcome for each order in the first batch of orders 608 — Cause transmission of fulfillment data to each fulfillment center that includes fulfillment instruction data for filling an complete order from the first batch of orders, the fulfillment instruction data including: identifying product, quantity, packaging instructions, and shipping instructions

Figure 6

SYSTEMS AND METHODS FOR CONTROLLING AND OPTIMIZING ORDER FULFILLMENT FROM A NETWORK OF FULFILLMENT CENTERS

CROSS-REFERENCE TO RELATED APPLICATIONS

This application is a national stage entry of International Patent Application No. PCT/US2023/065229 filed Mar. 31, 2023 which claims the benefit of U.S. Provisional Patent Application No. 63/326,606 filed Apr. 1, 2022 entitled "Systems and Methods for Controlling and Optimizing Order Fulfillment from A Network of Fulfillment Centers", each of which is incorporated by reference herein in its entirety.

TECHNICAL FIELD

The disclosed embodiments relate generally to supply chain management and more specifically to systems and methods for controlling and optimizing order fulfillment from a network of fulfillment centers.

BACKGROUND

Supply chain management requires quick and efficient fulfillment of customer orders. Order routing services need to take into account specific needs of particular businesses and/or markets. The problem of determining which fulfillment center or combination of fulfillment centers that is best suited for filling a customer order is non-trivial and require complex models that take into consideration availability of resources, transportation network status, customer expectations, and/or order content characteristics, among other factors. There is a need for a routing system that improves order handling systems and service to customers that may lead to one or more of shortened delivery time, improved package handling (e.g., fewer packages, fuller packages, and/or appropriate package materials), improved predictability of delivery times, reductions in resource requirements (e.g., labor, materials, supply and distribution chain external costs), improvements to integration of new product categories within the network.

SUMMARY

Accordingly, there is a need for systems and methods that address at least some of the problems described above. Aspects of the system disclosed herein utilize advanced mathematical models and/or cloud infrastructure, to provide routing decisions that scale with growth. For example, the system allows for parallel execution, so when a business grows, the system is capable of handling additional load. The system preferably uses a data science driven engine that determines optimal routing for a batch of orders by optimizing the products in each package for customer experience and fulfillment center capacity. Here, optimal routing means that there may not be any other better routing solution for a given set of costs and constraints. Customer experience may be improved because of quicker delivery and/or fewer boxes being delivered.

In accordance with some embodiments, a method executes at a computer system having one or more processors and memory storing one or more programs configured for execution by the one or more processors. The method may be used for controlling order fulfillment from a network of fulfillment centers. The method includes receiving a first batch of orders defined by either a threshold number of orders received or a predetermined period of time after a first order is received. The method also includes assembling a model based on the first batch of orders, the model comprising a plurality of modules. Each module in the model includes algorithms having fulfilment logic and variables based on constraints, external factors and routing objectives of the network related to the first batch of orders. The method also includes receiving a model output for the model comprising an allocated solution for each of the variables that is resolvable to shipping outcome for each order in the first batch of orders. The method also includes causing transmission of fulfillment data to each fulfillment center that comprises fulfillment instruction data for filling an complete order from the first batch of orders, the fulfillment instruction data including: identifying product, quantity, packaging instructions, and shipping instructions.

In some embodiments, the constraints include capacity limitations of each fulfillment center in a fulfillment center network based on at least one of: i) time constraint for shipping items; ii) operational resource availability at each fulfillment center; iii) inventory availability at each fulfillment center; iv) shipping capacity; (v) labor capacity and (vi) batch-specific variation to one or more of the foregoing.

In some embodiments, the constraints include i) a network capacity to ship a predetermined number of units and; ii) for each fulfillment center, an allocated fulfillment center capacity expressed as a portion of the predetermined number of units, and wherein assembling the model comprises applying a reallocation function directing a change to an allocation of orders among the fulfillment centers to keep the network within the predetermined total network unit volume.

In some embodiments, the reallocation function operates within a predetermined tolerance, is based on a total number of items shipped from each fulfillment center, and includes a cost function in combination with a mis-allocation cost function.

In some embodiments, the reallocation function directs a change to an allocation based on at least a predetermined allocation tolerance for each fulfillment center. In some embodiments, the change to an allocation is further based on a maximum tolerance percentage for each fulfillment center measured as a percentage of a total network volume for the network of fulfillment centers. In some embodiments, the maximum tolerance percentage varies by time of day.

In some embodiments, the constraints include an order fulfillment constraint that sum of quantities belonging to all packages shipped using any mode and delivered from all fulfillment centers equals an ordered quantity for each item.

In some embodiments, the constraints include an inventory availability constraint that quantity of an item from all packages shipped from any fulfillment center using any available mode is less than or equal to the available quantity in the fulfillment center.

In some embodiments, assembling the model comprises minimizing shipping costs for shipping each sub-package from each fulfillment center used to ship a product, wherein the shipping costs are based on weight of each item.

In some embodiments, assembling the model comprises minimizing total fulfillment time for all packages based on constraints for each package and for each customer, wherein fulfillment time is a time period that starts upon order creation for a package and ends upon completion of delivery for the package.

3

In some embodiments, assembling the model comprises minimizing order splits to ship all order items from a same fulfillment center.

In some embodiments, assembling the model comprises minimizing line-item splits caused by shipping a same SKU from two or more fulfillment centers.

In some embodiments, each order includes an order for at least one product from a menu of products In some embodiments, the routing objectives include allowing an order to be fulfilled by multiple fulfillment centers only if containing to model to limit fulfillment of the order to a single fulfillment center is not numerically solvable in a predetermined amount of time.

In some embodiments, the method further includes: displaying the fulfilment logic and the variables for the first batch of orders, in a graphical user interface; displaying one or more affordances to adjust the fulfillment logic or the variable; and in response to receiving a user input to select the one or more affordances, repeating, assembling the model, receiving the model output for the model, and causing retransmission of the fulfillment data, based on the user input.

In another aspect, an electronic device includes one or more processors, memory, a display, and one or more programs stored in the memory. The programs are configured for execution by the one or more processors and are configured to perform any of the methods described herein, according to some embodiments.

In another aspect, a non-transitory computer readable storage medium stores one or more programs configured for execution by a computing device having one or more processors, memory, and a display. The one or more programs are configured to perform any of the methods described herein, according to some embodiments.

Thus, methods and systems are disclosed that enables efficient and optimal routing of shipments.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Embodiments below, in conjunction with the following drawings in which like reference numerals refer to corresponding parts throughout the figures.

FIG. 3B shows an example UI that shows parameters for optimizing a fulfillment center (FC), according to some embodiments.

4

Figure 5A:

FIG. 5A shows an example UI for uploading configuration files, according to some embodiments.

Figure 5B:
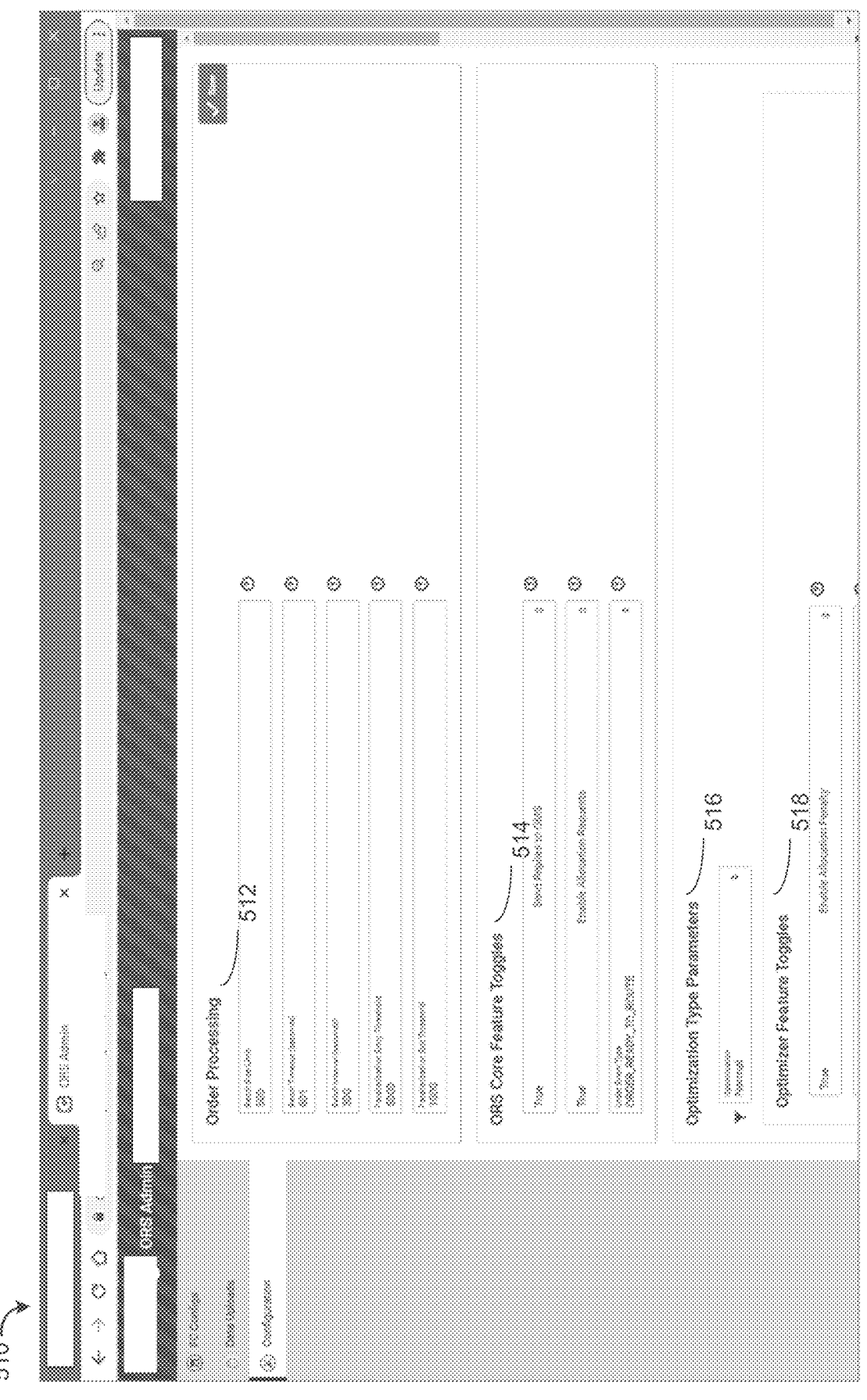

FIG. 5B shows another example UI for uploading configuration, according to some embodiments.

FIG. 6 shows a flowchart of a method for controlling order fulfillment from a network of fulfillment centers, according to some embodiments.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring one or more of these specific details.

DESCRIPTION OF EMBODIMENTS

Figure 1A:
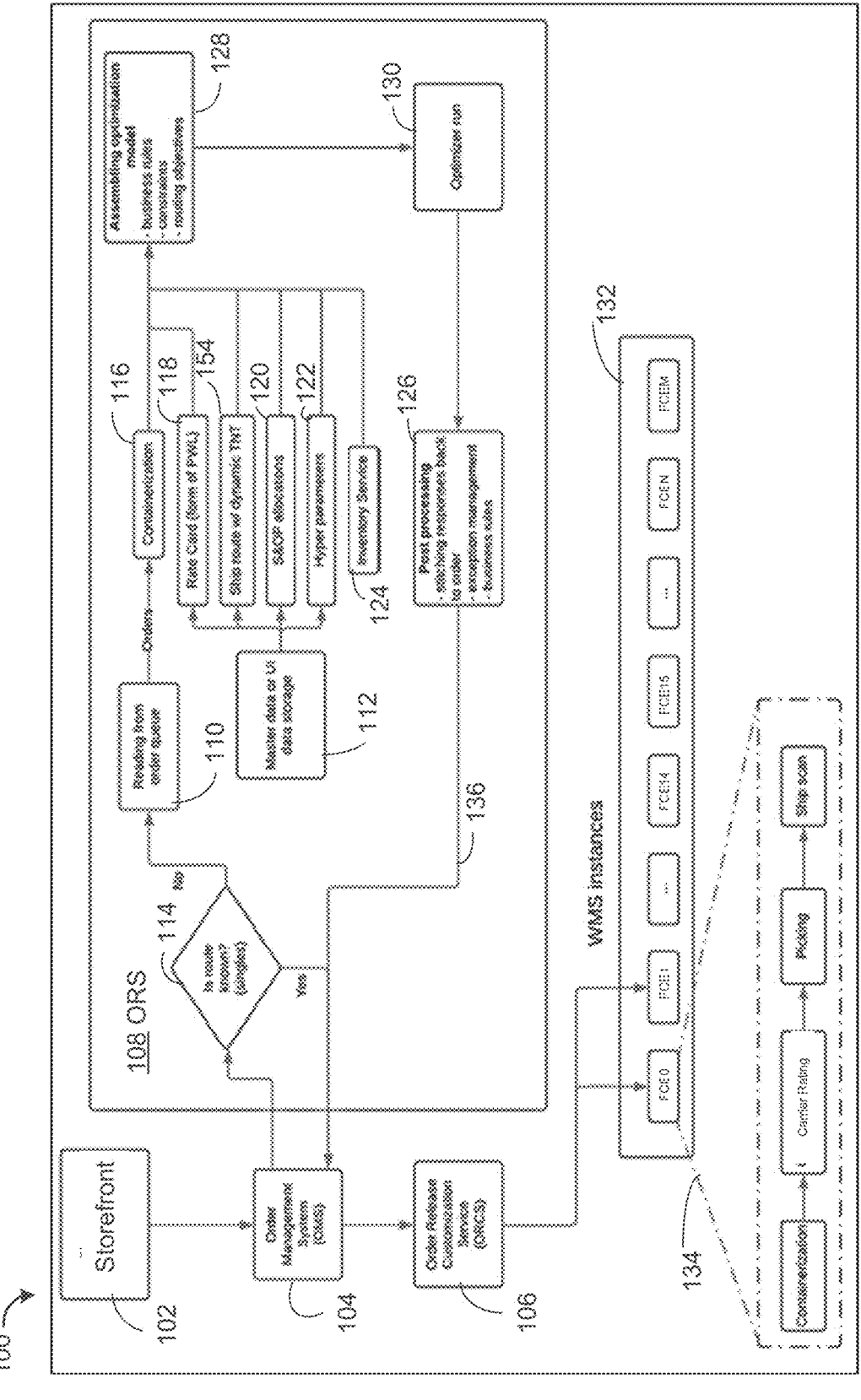
FIG. 1A shows a block diagram of a system for controlling order fulfillment from a network of fulfillment centers, according to some embodiments.

FIG. 1A shows a block diagram of a system 100 for controlling order fulfillment from a network of fulfillment centers, according to some embodiments. A storefront 102 (e.g., a web server) receives requests for orders for fulfillment. The storefront 102 sends received orders to an order management system (OMS) 104 which is responsible for managing incoming orders. The OMS 104 sends received orders to an order routing service (ORS) 108 that determines optimal routes for the orders. The OMS 104 and the storefront 102 may be implemented in a same server or different servers. The ORS 108 may be configured to determine (114) if the order has an associated route (e.g., an order for singles, items with a single line, i.e. single SKU with quantity of one or more). If there is an associated route, the ORS 108 transmits the route back to the OMS 104. For orders that do not yet have an associated route, the ORS 108 may read (110) orders from an order queue and containerize (116) the orders. A master data or UI data storage 112 may store and supply rate card 118, ship routes with dynamic time in transit (TNT) 154 (i.e., routes with actual TNT which considers the day of the week and transit standards, such as zip codes, holiday schedule, on-shelf availability), sales and operations planning allocations 120 and hyper parameters 122, to a module 128 that assembles optimization model based on business rules, constraints and routing objectives and an inventory service 124. An optimizer 130 (e.g., a mathematical problem solver) is run on the model generated by the module 128 to obtain optimal routes for the orders based on the constraints. The optimal routes from the optimizer 130 may be post-processed (126) to ensure responses are added or sticked back to order, exceptions are managed, and to verify that business rules are enforced. Output 136 of the post-processing step 126 are sent to the OMS 104, for routing orders. An order release customization service (ORCS) 106 may customize orders for the routes from the OMS 104 which are split into warehouse management system (WMS) instances 132. Each WMS instance 134 may include components for containerization, carrier rating, picking, and ship scanning.

Figure 1B:
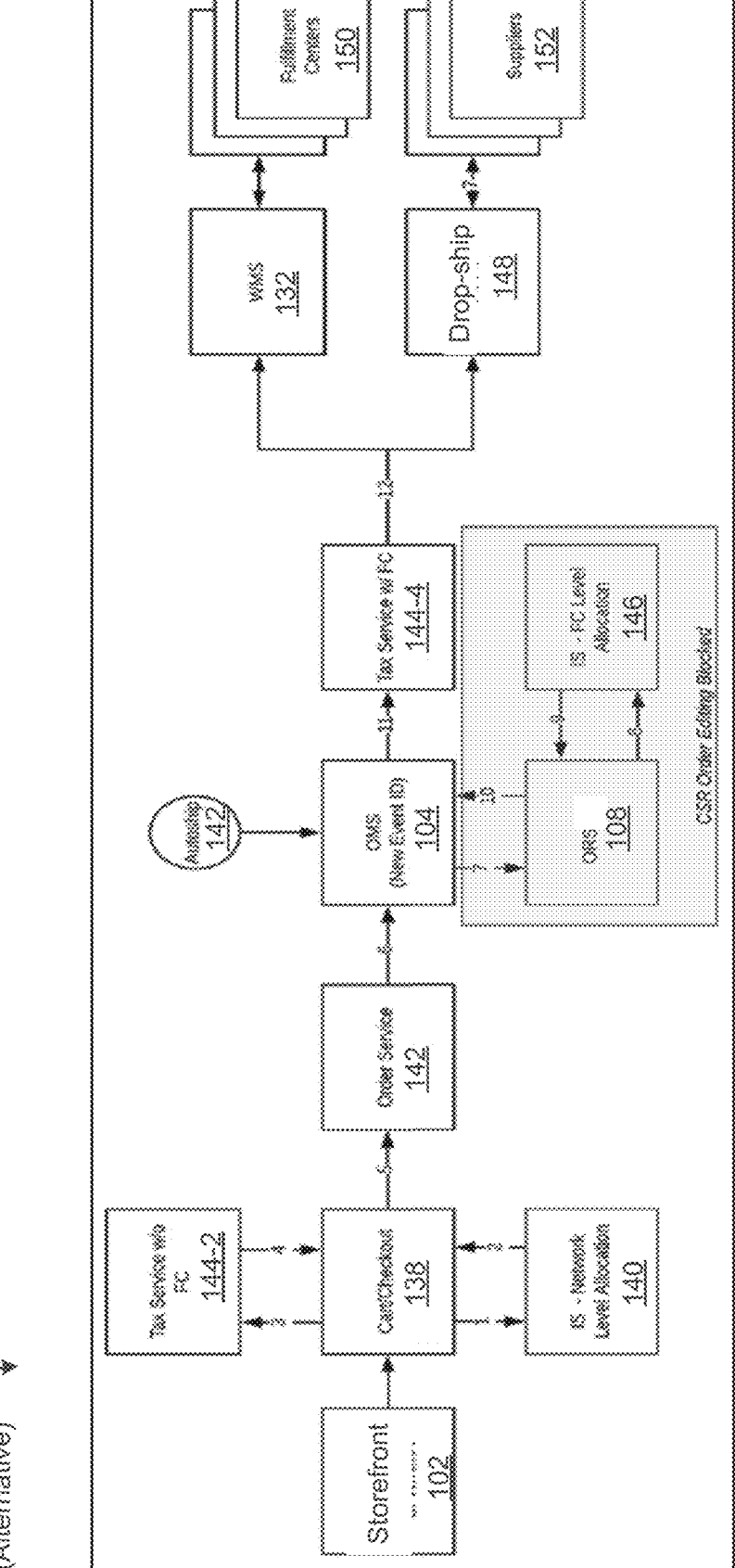
FIG. 1B shows a block diagram for an alternative view of the system shown in FIG. 1A, according to some embodiments.

FIG. 1B shows a block diagram for an alternative of the system 100 shown in FIG. 1A, according to some embodiments. As in FIG. 1A, a storefront 102 receives requests for orders via a website. The orders are sent to a cart or checkout module 138 which sends (1) the orders to an inventory service 140 that calculates and sends (2) network level allocation of inventory for the orders to the module 138. One or more tax service modules (e.g., a module 144-2 and 144-4) receives (3) order information from the module 138 and calculate and sends (4) taxes for the orders (with or without fulfillment centers). Subsequently, the module 138 sends (5) the orders to an order service module 142 which forwards (6) the orders to the OMS 104. The OMS 104 may receive auto-shipment information from a module 142. For example, a user or a customer sets up an order through a storefront, and the system sets up auto-shipment for the customer. As shown in FIG. 1A, the OMS 104 sends (7) orders to an ORS 108 that determines and sends (10) optimal routes for the orders to the OMS 104. The ORS 108 may receive (9) fulfillment center-level allocation information from an inventory service module 146, and send (8) order information to update the module 146. After the OMS 104 obtains a route for the order, the OMS 104 sends (11) the order information to a tax service module 144-4 for calculating taxes with the fulfillment centers in the route. This information is forwarded (12) to an WMS 132 for interfacing with fulfillment centers 150 and/or a drop-ship program 148 for interfacing with suppliers 152.

Figure 2:
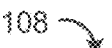
FIG. 2 is a block diagram of an order routing service (ORS), according to some embodiments.

FIG. 2 is a block diagram of the ORS 108, according to some embodiments. The ORS 108 may be modeled as a pipeline that includes a phase for queue building 200, a phase for pre-processing 202, a phase for routing 204 and a phase for post-processing 206. The queue building phase 200 may include determining item type (210) from an OMS ingress queue 208 (queues orders from the OMS 104), breaking orders (212) into sub-orders by item type, cartonizing (214) sub-orders and queueing finished cartonized sub-orders in a queue 216 for the pre-processing phase 202. The phase 202 may include building a batch (218) (e.g., a batch of orders) from the queue 216, checking inventory (220) for items in the batch, getting FC data (222) for FC in batch (e.g., configuration and allocation data), getting ship route data (224) for Zip codes in batch, calculating TNTs (226) for FC or Zip codes in batch and filtering out (228) any orders that cannot be routed. This is followed by the routing phase 204 that includes building (sometimes called assembling) a linear optimization model (230), running a model optimizer (232) on the assembled model, and recording routing decisions (234). The model optimizer (232) may include a mathematical problem solver. In the post-processing phase 206, the routes determined in the routing phase 204 are used to recombine sub-orders (236) into orders, errors are stamped (238), inventory service is informed (240) to allocate inventory, results are sent (244) to a data pipeline (248). The results are also sent (246) to the OMS 104, via an OMS egress queue 250. When inventory is allocated, allocated quantity information is updated in a persistence layer 242 (e.g., a persistent database) which may be used to get FC data for FCs in the batch (for future orders).

The following description includes mathematical definition of a model. The model may be implemented using Python and/or other similar languages. The model may be used to describe inventory and order fulfilment constraints, shipping costs, TNT penalty, allocation (both for regular items (e.g., non-regulated item based) and pharmacy (e.g., regulated prescriptions that are package based)), order line split penalty and order split penalty. The system may route packages taking into account customer orders that may be split by type (e.g., pharma, regular, freezer, fresh), and different physical fulfillment centers may handle different item types.

In the following description, values available before the start of optimization are marked with a prefix (Constants). Objects ending with W are weights, objects ending with Q are quantities (counts), and objects ending with C are costs (in $). All items in a package can be further split. A package can have an order split (e.g., different items are shipped in different sub-packages), and/or a line-item split (single item quantities are split, e.g., same item in multiple packages).

Example Constraints

The table below shows terms used in example constraints following the table.

| | |
|---|---|
| $Q_{ipfm}$ | Quantity of item i, belonging to package p, delivered from fulfillment center (FC) f using mode m (variable) |
| i | Item (notational variable) |
| p | package (notational variable) |
| f | FC (notational variable) |
| m | Shipping mode (notational variable) |
| _M# | List of available shipping modes (constant) |
| _P# | Number of packages in the batch (constant) |
| _PI#$_p$ | Number of items in the package p (constant) |
| _FC# | Number of available FCs, including VFC when needed (constant) |
| _IOQ$_{ip}$ | Item Ordered Quantity, for item i and package p (constant) |
| _FCQ$_{if}$ | Available Quantity of item i in FC f (constant). |

Order fulfilment constraint: Sum of quantities of an item i, belonging to package p shipped using mode m ($Q_{ipfm}$) delivered from all FCs must be equal to ordered quantity (_IOQ$_{ip}$), as shown in the equation below:

$$\sum_m^{\_M\#} \sum_{f=1}^{\_FC\#} Q_{ipfm} = \_IOQ_{ip} \; \forall \; i, p$$

The system seeks to (a) make sure all items are indeed delivered (by any combination of FCs/deliveries), and (b) prevent line item split (if possible).
Inventory Availability constraint: Quantity of an item i from all packages shipped from FC f using any available mode m must be less than or equal to the available quantity in the FC f, as shown by the Equation below:

$$\sum_m^{\_M\#} \sum_{p=1}^{\_P\#} Q_{ipfm} \le FCO_{if} \; \forall \; i, f$$

Example Costs

Shipping cost includes cost of shipping each sub-package from each involved FC. The table shown below describes terms used in the equation for calculating package weight (equation following the table).

| | |
|---|---|
| $W_{pfm}$ | Total weight of items (weight of sub-package p) shipped from FC f (variable) using mode m. |
| _W$_i$ | Weight of item i (constant). |
| _BW | Box Weight correction factor (constant). How much the total weight increases when the box and the fillers are added. May be set to 1. |
| _PSC$_f$ | Package Shipping Cost for FC f. Piecewise linear constraint (constant). |

$$W_{pfm} = \_BW \sum_{i=1}^{\_PI\#_p} Q_{ipfm} * W_i \; \forall \; p, f, m$$

In some embodiments, the system receives orders from customers who can order any number of items. The system allocates these items to designated individual boxes or packages. The optimizer solves for compliant package routes. In some embodiments, batches may be designated to include multiple orders and/or multiple packages associated with an order. Preferably, a collection of packages to be shipped in associate with one or more orders may be designated as being associated with a single batch. So, for example, if there is an order with two packages, then the system includes both packages in a same batch. Total cost of shipping all packages of a batch is calculated using Equation (1) shown below:

$$\sum_{m}^{\_M\#} \sum_{f=1}^{\_FC\#} \sum_{p=1}^{\_P\#} \_PSC_f(W_{pfm}) \tag{1}$$

Penalty for Shipping from Remote FCs: TNT>minTNT+1 cost includes penalty for shipping from remote FCs. minTNT is set by carriers and represents how fast a package can be shipped from any FC to a given zip code using a specific mode. +1 means that a penalty will be introduced if a given combination of FC, zip code, and a mode has a TNT greater than minimum possible.

| | |
|---|---|
| FC$_{pf}$ | Binary variable, indicating that FC f ships package p |
| _TNTC$_{tnt}$ | TNT penalty for FC f, and package p. Used only for TNT > MinTNT. The penalty is the same for all packages having the same TNT regardless of FC involved (constant) |
| _PW#$_p$ | Total weight of package p (constant) |

If any of $Q_{ipfm}$ in package p shipped from FC f are not zero, FC$_{pf}$ will be 1. If all Q are zero, FC will be zero, because the optimization is instructed to seek minimum.

$$\_PI\#_p * FC_{pf} \geq \sum_{m}^{\_M\#} \sum_{i=1}^{\_PI\#_p} Q_{ipfm} \ \forall \ p, f$$

The above constraint is equivalent to the inequality shown below:

$$\_PW\#_p * FC \geq W_{pf} \ \forall \ p, f$$

Suppose the system receives an order for an item from a zip code. The system determines for that zip code, a nearby FC that can fulfill that order in a shorter time. The system penalizes other FCs that can fulfill that order in a longer time. The system considers shipping speed, costs, allocation, and splitting to find a best combination of FCs for fulfilling a batch of orders. The system ships all items ordered, and all items are shipped from a location that has the item. The system operates under these constraints, and uses other factors as costs. The system uses the cost factor for penalty for shipping from remote FCs if TNT for the package is greater than minTNT. The cost factor is given by Equation (2) shown below:

$$\sum_{f=1}^{\_FC\#} \sum_{p=1}^{\_P\#} \_TNTC_{tnt} * FC_{pf} \tag{2}$$

Order Split Penalty: This penalty encourages (but does not require) the optimizer to resolve the model for a solution that ships all order items from the same FC. This penalty is not added to the model if the order has quantity equal to 1. In one embodiment, applying an order slit penalty allows the system to deviate from a designated preference (e.g., shipping from a single FC) when the preference would preclude a constraint (e.g., all orders much ship, even if it means that order must be fulfilled by more than one FC).

| | |
|---|---|
| FCO$_{of}$ | Binary variable, indicating that FC f ships all items of order o. |
| _OSC | Order Split Cost. (constant) |
| _OI#$_o$ | Total number of items in the order o. (Unique SKUs times Quantity of each SKU) (constant) |

FCO$_{of}$ is 1 if any unit ships from FC f. If no units ship from the FC, FCO$_{of}$ can be 0 or 1. The optimizer calculates FCO$_{of}$ in the course of optimization. Since the system causes the optimizer to seek the minimum, the optimizer will try to minimize number of FCs that are involved in shipping of a given order o. Optimization algorithm can find either the maximum or the minimum. This is configurable, and the model described herein instructs the optimizer to find the minimum.

$$\_OI\#_o * FCo_{of} \geq \sum_{m}^{\_M\#} \sum_{i=1}^{\_OI\#_o} Q_{ipfm} \ \forall \ f, p \in \ \text{order } o \tag{3}$$

$$\sum_{f=1}^{\_FC\#} \_OSC * FCO_{of} \ \forall \ o$$

Line-Item Split Penalty avoids splitting line items (shipping the same SKU from two or more FCs). The penalty nudges the optimizer to avoid the split if possible. Generally, the optimizer tries to avoid penalties if possible, while constraints are not optional

| | |
|---|---|
| FC$_{ifp}$ | Binary Var, indicating that FC f ships all items of the SKU i of package p |
| _ISC | Line Item Split Cost per item split. (constant) |
| _OI#$_{ip}$ | Number of ordered items of SKU i in the package p (constant) |

FC$_{if}$ can be 1 only if full quantity of item i belonging to order o ships from the FC f. The optimizer is "rewarded" for having FC$_{if}$ set to 1. FC$_{ifp}$ is set to 1 only if item is not split. Formula (4) shown below has negative sign, so having all ordered quantity of the item shipped from the same FC will lower the total cost. The optimizer is set to minimize the cost.

$$\_OI\#_{ip} * FC_{ifp} \leq \sum_{m}^{\_M\#} Q_{ipfm} \ \forall \ f, p, i$$

The cost factor (line item split penalty) is shown by (4) shown below:

$$- \sum_{f=1}^{\_FC\#} \_ISC * FC_{ifp} \forall \ p, i \tag{4}$$

Example Allocation

An FC has a limited capacity to ship items in a time interval (typically 24 hours, shorter intervals may be supported). In some embodiments, the capacity planning assumes a certain number of units that can be shipped that is expressed as a percentage of the total network unit volume. Since the number of orders arriving daily varies (e.g., at any particular FC, in the overall network), some embodiments include a mechanism to allocate orders between the FCs to keep the network within a pre-determined volume (e.g., a maximum volume capacity of the network, or an ideal volume capacity of the network). For each batch containing different orders and items, a new set of equations described herein is created and input to the optimizer. The system tries to have each FC allocated a certain percentage of total number of units. At the end of a day, if the allocation differs from that set percentage, those allocations are penalized.

In some embodiments, allocation is achieved as a penalty in the cost function. An example algorithm is described below, according to some embodiments.

Mis-Allocation cost: Package item count:

| | |
|---|---|
| $TQ_f$ | Total number of items shipped from FC f (for all packages) (variable) |
| $\_MAC_f$ | Miss-Allocation Cost for FC f. Piecewise linear constraint (const). The $\_MAC$ for the virtual FC is not needed. |

$$TQ_f = \sum_{p=1}^{\_P\#} \sum_{i=1}^{\_PI\#} \sum_{m}^{\_M\#} Q_{ipfm} \quad \forall \, f \quad (5)$$

$$\sum_{f=1}^{\_FC\#} \_MAC_f\left(TQ_f\right)$$

In some embodiments, a pre-processing algorithm is used to determine $MAC_f$. The algorithm includes determining the expected allocated quantity at the batch level for FC f at the time t+1 (end of interval t) as a product of total daily allocation for the FC (TDA) and Total Network allocated quantity at the time t+1.

$$FCQ_{ft+1} = TDA_f * TNQ_{t+1}$$

| | |
|---|---|
| $FCQ_{ft}$ | Expected allocated quantity for FC f at time t. |
| $TDA_f$ | Total Daily Allocation % for FC f. |
| $TNQ_t$ | Total Network Quantity allocated up until time t. |

Total Network Allocated Quantity (TNQ) at t+1 is a sum of already allocated quantity ($TNQ_t$) and all units allocated in this batch run (t+1). The double sum adjusts for (partial) OOS items as shown below:

$$TNQ_{t+1} = TNQ_t + \sum_{p=1}^{\_P\#} \sum_{i=1}^{\_PI\#} \_IOQ_{ip}$$

The number of units the FC f should have allocated after the optimization run (at end of interval t) is given by the Equation below:

$$EAQ_{ft+1} = FCQ_{ft+1} - TAQ_{ft}$$

| | |
|---|---|
| $EAQ_{ft+1}$ | Expected Allocated Quantity for FC f at time t + 1 (Allocation Target). After the optimization run, the FC f should have EAQ units allocated. |
| $TAQ_{ft}$ | Total allocated quantity for the FC f until the end of interval t. |

The Allocation Tolerance Interval for allocation of items in a batch to an FC is defined as a percentage of total allocation:

$$ATQ_f = \begin{cases} TNQ_{t+1} * TP_f & \text{if } TNQ_{t+1} * TP > MTQ_f \\ MTQ_f & \end{cases}$$

$$MTQ_f = MTP_f * \text{Avg\_Daily\_Qty}_f$$

| | |
|---|---|
| $ATQ_f$ | Allocation Tolerance Quantity for the FC f. |
| $TP_f$ | Tolerance Percentage for the FC f. [% of network volume]. |
| $MTP_f$ | Maximum Tolerance Percentage. At the beginning of the day, the $TNQ_f*TP_f$ value is quite small so the allocation cost could raise quickly while it is not too concerning. In these situations, MTP is used instead. (15% of average daily volume). |
| $MTQ_f$ | Maximum Tolerance Quantity for FC f. |

The piece-wise linear cost function $MAC_f$ is constructed for $TQ_f$, centered around $EAQ_{ft+1}$.

| | |
|---|---|
| $ACT_f$ | Miss-allocation Cost while within the Tolerance. ($/unit) |
| $ACU_f$ | Miss-allocation Cost unit allocated outside of the Tolerance Interval, the FC f. ($/unit) |
| $AZR_f$ | Miss-allocation Zero Cost Ratio for the FC f. (%) |

Figure 4A:
FIG. 4A shows a graph plot for cost versus units, according to some embodiments.

FIG. 4A shows a graph plot 400 for cost versus units, according to some embodiments. This plot shows the shape of the cost function for allocation. It is preferred to have actual allocation match the requested percentage so deviations (e.g., both under- and over-allocations) are penalized, as shown by the symmetry in the plot. The region 402 corresponds to unattainable allocation. To left of EAQ–ATQ, is undesired allocation 404, to right of EAQ+ATQ is another undesired allocation 408. Desired allocation interval (tolerance interval) 406 is between EAQ–ATQ and EAQ+ATQ. AZR percentage is indicated by label 410, ACT ($/unit) is indicated by label 412, and ACU ($/unit) is indicated by label 414.

Figure 4B:
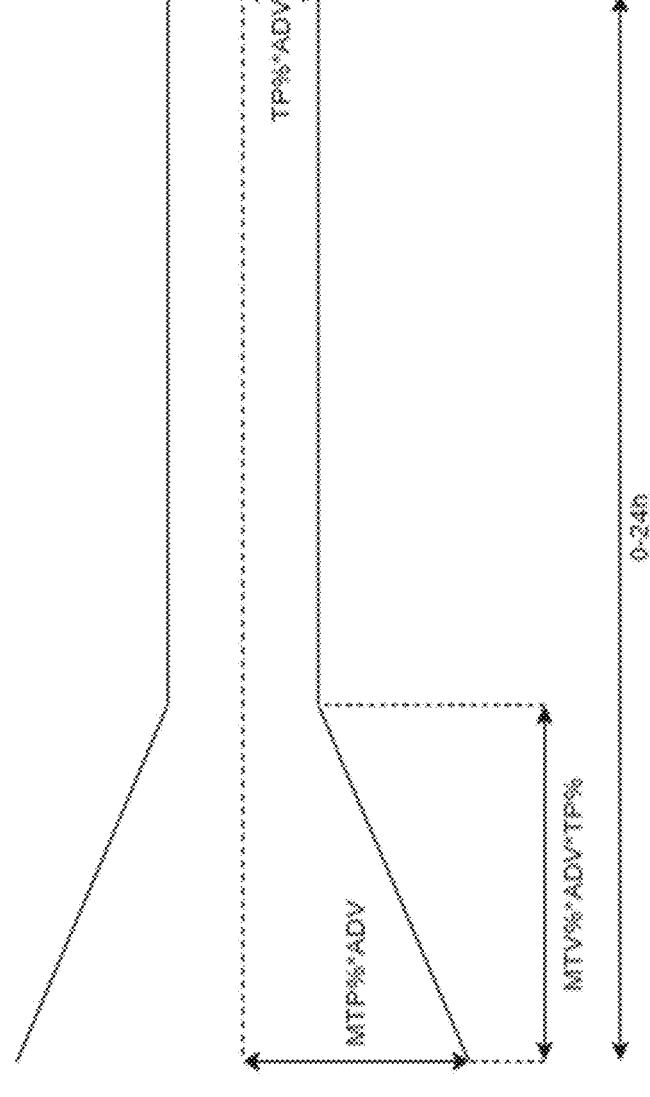
FIG. 4B shows an example desired allocation interval shape for a twenty-four hour time period.

FIG. 4B shows an example desired allocation interval shape 416 for a 24 hour period. The plot shows a wider no penalty zone at the beginning of the 24 hour period which is gradually tightened as the day progresses. This allows for lower percentage of cross-country shipments that would be caused by the fact that the eastern part of the country starts ordering before the west.

MTV$_f$ — Maximum Tolerance Volume (%). The Desired Allocation PWL width changes from MTP % to TP % (as shown by the funnel shape in FIG. 4B) when allocation increases from 0 as the day progresses (shown by the arrow labeled 0-24 h).

If an FC serves multiple ORS Item Types, and a separate allocation for each (or groups of) ORS Item Type(s) exists, the FC is configured as a set of logical FCs.

Example Pharmacy Allocation

It is unreliable to utilize unit volumes for pharmacy allocation, due to the existence of pharmacy orders with large quantities of units (e.g., pill orders). Allocation includes assigning a percentage of total units and acts as a proxy to labor intensity. Allocating thousand pills in a single order requires less labor than allocating thousand packages each having one unit. The system may cause the optimizer to utilize pill-rich orders to balance the network but the number of packages, expressed as a percentage of total is very different from the requested allocation percentages. For this reason, in some embodiments, for pharmacy orders, the optimizer is instructed to use a modified logic to allow for allocating package percentage instead of unit volume percentage (as described above, for regular items). Both the allocation by units and the allocation by packages are used as a proxy for keeping all teams in all FCs equally busy.

In some embodiments, the pharmacy allocation follows the same logic, but attaches a new meaning to TQ$_f$, which now represents total package quantity.

PP$_{pf}$ — Pack Present binary variable, indicating that parts of (or a whole) of package p is being shipped from FC f
PMQ — Maximum quantity of all units in any package of a given batch. A constant that is dynamically determined in each batch.

PP$_{pf}$ will have a value of 1 if at least one unit from package p was shipped from FC f. PP$_{pf}$ can have value of 1 even if no items were shipped from an FC f.

$$PMQ * PP_{pf} \geq \sum_{m}^{M\#} \sum_{i=1}^{PI\#} Q_{ipfm} \quad \forall f, p$$

PP$_{pf}$ will have a value of 0 if nothing is shipping from an FC f. PP$_{pf}$ can have a value of 1 even if at least one item were shipped from an FC f.

$$PP_{pf} \leq \sum_{m}^{M\#} \sum_{i=1}^{PI\#} Q_{ipfm} \quad \forall f, p$$

TQ$_f$ is now a simple sum of all PP$_{pf}$ variables, and the remaining algorithm follows the logic of allocation for units.

$$TQ_f = \sum_{p=1}^{P\#} PP_{pf} \quad \forall f \qquad (5)$$

$$\sum_{f=1}^{FC\#} MAC_f(TQ_f)$$

The objective function for the optimizer is then defined by the equation shown below:

$$MINC = (1) + (2) + (3) + (4) + (5)$$

In the description herein, the term singles refers to orders for item type with a single line, i.e. a single SKU with quantity of one or more. For example, an order has one pharmacy SKU and two core SKUs. The pharmacy order will be considered a 'singles' order and core will not be considered a singles order since it has multiple SKUs which need to be shipped. The term order batch refers to a number of orders or orders collected over a predetermined period of time (e.g., 2 minutes), whichever comes first to consider order collection complete for a batch. Containerization may occur at two points in the system. The first occurrence is when it is used for estimating the item grouping into packages. The second containerization occurs in WMS which actually creates the label. Some systems assume that drop ship items will be cartonized against boxes available in a WMS. Package rating refers to rate card in the form of a PWL. Piece-wise Linear Function is a segmented rate card representation in the form of a straight line broken sticks where cost holds for that weight block. In some embodiments, rating of packages occurs within the optimizer. Dynamic TNT is the actual TNT which considers the day of the week and transit standards (zip code, holiday, OSA). OSA zips include rural zip codes that have restricted weekend delivery for four or five days of time in transit (TNT).

Figure 3A:
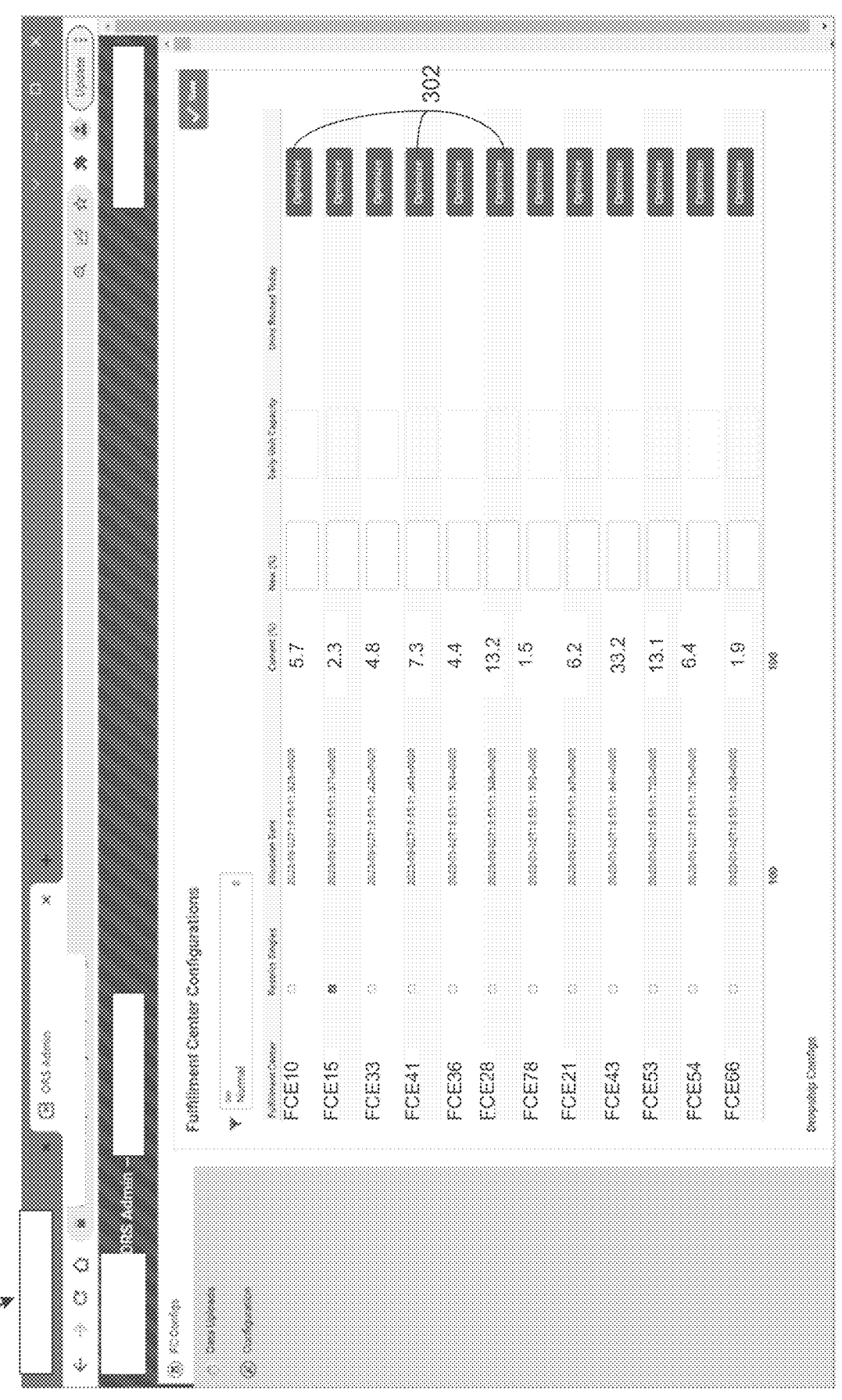
FIG. 3A shows an example UI for specifying daily allocation, according to some embodiments.

FIG. 3A shows an example UI 300 for specifying daily allocation, according to some embodiments. The UI may allow users to specify percentage daily allocation (percentage of total units to be served by each FC). The UI may also allow users to set maximum number of units to be served by an FC per day. In some embodiments, the UI restricts singles option makes singles orders (order with only one SKU) more expensive to ship from the given FC, so the FC will only ship singles when there is no other option. The example UI shows optimize buttons or affordances 302 that may be selected to display additional parameters related to configuration of each FC. FIG. 3B shows an example UI 304 that shows parameters for optimizing a FC named AVP1.

Example hyper parameters shown in the table below may control the behavior of the optimizer and the pre-processor. These parameters rarely change, and a supply chain analytics department may refine and provide the default values.

| Name | Type of Value | Description |
|---|---|---|
| MAX_COST | Dollar amount | Shipping cost used to effectively prevent shipping methods from ever being used. For example, if certain parts of the PWL function should never be used (USPS1C for weight > 1b should have MAX_COST). |

-continued

| Name | Type of Value | Description |
|---|---|---|
| VFC_BASE_COST | Dollar amount | Cost of shipping package of any weight, using VFC specific virtual mode (ship from the VFC) |
| VMD_BASE_COST | Dollar amount | Cost of shipping package of any weight, using the virtual mode of a non-virtual FC |
| TNT_COST_* | Dollar amount | Cost of increasing TNT by x days per package (TNT in 1 . . . 6) |
| SPLIT_COST | Dollar amount | Cost of shipping an order from more than one FC |
| RATE_WT_LIMIT | Weight (in lb) | Max weight rate available in rate tables |
| FREEZER_MAX_TNT | Days | Max allowed dynamic TNT for a freezer route |
| PHARMA_DELAY_DAYS | Days | Orders older than PHARMA_DELAY_DAYS only have overnight shipping options |
| DROP_DELAY_* | Time in minutes (FC specific) | There is a delay between the optimizer run and the time order will be "dropped" to an FC, causing the "drop" time to be after the cutoff time even though the optimization happened before the cutoff. Each FC should have its own value. |
| REG_EXP_TNT | Days | Regular, non autoship packages, lighter than REG_EXP_WT will ship express if TNT is greater than REG_EXP_TNT |
| REG_EXP_WT | Weight (in lb) | Regular, non autoship packages, originating from an FC with TNT > REG_EXP_TNT will ship express if the package weight is less than REG_EXP_WT |
| UOM_EXP_TNT | Days | UOM, non autoship packages, lighter than UOM_EXP_WT will ship express if TNT is greater than UOM_EXP_TNT |
| UOM_EXP_WT | Weight (in lb) | UOM, non autoship packages, originating from an FC with TNT > UOM_EXP_TNT will ship express if the package weight is less than UOM_EXP_WT |
| LINE_ITEM_SPLIT_COST | Minimum dollar value . . . MAX_COST + dollar amount | Penalty for splitting a line item within an order and ship it from multiple FCs. |

TNT penalty is typically calculated by item type. Inventory service is a service that provides ORS with the inventory availability for items that make up the orders in the batch. ORS will route orders to an FC as long as it is favorable for the cost function and until it reaches its ship unit capacity (sometimes called FC ship unit capacity). Total capacity is considered on a batch by batch basis. Each batch is processed at the end of a predetermined time period (e.g., every 10 minutes, 10 minutes after a first order or package is allocated to a batch). In some embodiments, the set of equations balance shipping costs, shipping speed, and labor costs for FCs. In some embodiments, when ship unit capacity has been reached at a particular FC for the batch, further allocation of ship units to that particular FC will terminate for the remainder of the batch. In some embodiments, the sum for ship units allocated is reset daily, and may only be used for volume exception management. In some embodiments, if no site has capacity remaining when optimizing the batch, the order will go to a virtual FC. In some embodiments, the optimizer provides the decision of how to route a package which is then stitched back to the order line level. In some embodiments, the optimizer also recommends a shipping mode and route. In some embodiments, shipping service level upgrade to express shipping for a package may happen downstream in a carrier rating sub-system within WMS, if a current criteria for express is met.

FIG. 5A shows an example UI 500 for uploading configuration files to the ORS 108, according to some embodiments. The example UI allows user to upload CSV files that govern behavior of the system. PWL (Piece-Wise Linear) rates 502 specify shipping costs, mode surcharge info 504 specifies additional costs imposed by carriers, DAS info 506 specifies additional shipping costs per zip code (imposed by carriers), and EDD AdjTNT & NextAdjTNT info 508 specifies expected TNT (Time in Transit) for each combination of FC and Zip code. FIG. 5B shows another example UI 510 for uploading configuration, according to some embodiments. For order processing 512, the GUI provides options for a user to specify batch size limit, batch timeout (in seconds), batch interval (in seconds), parallelization entry threshold, and parallelization exit threshold. The GUI 510 may also provide interface features 514 for sending replies to OMS 104, enabling allocation requests, and/or setting order ready to route. Various optimization type parameters 516 (e.g., optimization levels), and affordances 518 for toggling optimizer features (e.g., enabling or disabling allocation penalty) may also be provided, according to some embodiments. Optimization parameters 516 may allow users to select an optimizer type (e.g., Normal, Freezer, Fresh, Pharma, UOM). For an optimizer type, the penalties can be turned or off. Batch size limit indicates line items that are collected before a batch is ready for optimization. Batch timeout indicates time (e.g., number of seconds) before batch optimization is interrupted. Some embodiments do not allow batches to run indefinitely. Some embodiments collect orders for a batch until the batch size reaches batch Size Limit or when batch interval expires. Parallelization entry threshold indicates number of orders in the queue before parallelization will start, and parallelization exit threshold indicates number of orders in the queue at which parallelization is turned off.

Example Method of Controlling Order Fulfillment From a Network of Fulfillment Centers FIG. 6 shows a flowchart of a method 600 for controlling order fulfillment from a network of fulfillment centers, according to some embodiments. The method 600 may be performed by the ORS 108 described above in reference to FIGS. 1A, 1B, and 2, according to some embodiments. The method includes receiving (602) a first batch of orders defined by either a threshold number of orders received or a predetermined period of time after a first order is received. In some embodiments, each order includes an order for at least one product from a menu of products.

The method also includes assembling (604) a model based on the first batch of orders, the model comprising a plurality of modules. Each module in the model includes algorithms having fulfilment logic and variables based on constraints, external factors (e.g., business rules) and routing objectives of the network related to the first batch of orders. Routing objectives separate external business rules (e.g., of a courier services, such as FedEx) and internal factors (e.g., minimize time to customer, minimize shipping cost, minimize number of packages required to ship). In some embodiments, the routing objectives include allowing an order to be fulfilled by multiple fulfillment centers only if containing to model to limit fulfillment of the order to a single fulfillment center is not numerically solvable in a predetermined amount of time. In some embodiments, the constraints include capacity limitations of each fulfillment center based on at least one of: i) time constraint for shipping items; ii) operational resource availability at each fulfillment center; iii) inventory availability (e.g., inventory levels, inventory assortment) at each fulfillment center; iv) shipping capacity; (v) labor capacity and (vi) batch-specific variation to one or more of the foregoing. These factors may be updated in real-time. In some embodiments, the constraints include i) a network capacity to ship a predetermined number of units and; ii) for each fulfillment center, an allocated fulfillment center capacity expressed as a portion of the predetermined number of units. In some embodiments, assembling the model includes minimizing total fulfillment time for all packages based on constraints for each package and for each customer. The fulfillment time is a time period that starts upon order creation for a package and ends upon completion of delivery for the package. In some embodiments, assembling the model comprises applying a reallocation function directing a change to an allocation of orders among the fulfillment centers to keep the network within the predetermined time in transit volume. The reallocation function may be based on labor and inventory availability and multiple runs of this same system to determine ideal allocation which may be based upon simulations that are run with assumptions of no labor and inventory constraints and existing assortments. In some embodiments, the reallocation function operates within a predetermined tolerance, is based on a total number of items shipped from each fulfillment center, and includes a cost function in combination with a mis-allocation cost function. In some embodiments, the reallocation function directs a change to an allocation based on at least a predetermined allocation tolerance for each fulfillment center. In some embodiments, the change to an allocation is further based on a maximum tolerance percentage for each fulfillment center measured as a percentage of a total network volume for the network of fulfillment centers. In some embodiments, the maximum tolerance percentage varies by time of day. In some embodiments, the constraints include an order fulfillment constraint that sum of quantities belonging to all packages shipped using any mode and delivered from all fulfillment centers equals an ordered quantity for each item. In some embodiments, the constraints include an inventory availability constraint that quantity of an item from all packages shipped from any fulfillment center using any available mode is less than or equal to the available quantity in the fulfillment center. In some embodiments, assembling the model comprises minimizing shipping costs for shipping each sub-package from each fulfillment center used to ship a product, wherein the shipping costs are based on weight of each item. In some embodiments, assembling the model comprises minimizing order splits to ship all order items from a same fulfillment center. In some embodiments, assembling the model comprises minimizing line-item splits caused by shipping a same SKU from two or more fulfillment centers.

The method also includes receiving (606) a model output for the model comprising an allocated solution for each of the variables that is resolvable to shipping outcome for each order in the first batch of orders. The model may execute in real time in an automatically scalable way. The method also includes causing transmission (608) of fulfillment data to each fulfillment center that includes fulfillment instruction data for filling an complete order from the first batch of orders, the fulfillment instruction data including: identifying product, quantity, packaging instructions, and shipping instructions.

In some embodiments, the method further includes: displaying the fulfilment logic and the variables for the first batch of orders, in a graphical user interface (examples of which are described above in reference to FIGS. 3A, 3B, 5A, and 5B); displaying one or more affordances to adjust the fulfillment logic or the variable; and in response to receiving a user input to select the one or more affordances, repeating, assembling the model, receiving the model output for the model, and causing retransmission of the fulfillment data, based on the user input.

Thus, various techniques are described for controlling order fulfillment from a network of fulfillment centers.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of controlling order fulfillment from a network of fulfillment centers, the method comprising:

receiving, at a processor, a first batch of orders defined by either a threshold number of orders received or a predetermined period of time after a first order is received;

assembling, at the processor, a model based on the first batch of orders, the model comprising a plurality of modules, wherein each module in the model includes algorithms having fulfilment logic and variables based on constraints, external factors and routing objectives of the network related to the first batch of orders, wherein the assembling causes the model to: (1) generate an initial allocation of the first batch of orders between fulfillment centers of the network of fulfillment centers that is within a predetermined volume, and (2) apply a reallocation function to direct a change to the initial allocation of the first batch of orders among the fulfillment centers to keep the network of fulfillment centers within the predetermined volume;

receiving, at the processor, a model output for the model comprising an allocated solution for each of the variables that is resolvable to a shipping outcome for each order in the first batch of orders;

performing, at the processor, an optimization on the model output to obtain optimal routes for each of the first batch of orders based on the constraints;

performing, at the processor, post-processing on the optimal routes to generate fulfillment data comprising fulfillment instruction data for filling complete order from the first batch of orders, the fulfillment instruction data including: identifying product, quantity, packaging instructions, and shipping instructions;

displaying the fulfilment logic and the variables for the first batch of orders, in a graphical user interface;

displaying one or more affordances to adjust the fulfillment logic or the variable;

in response to receiving a user input to select the one or more affordances, applying a pre-processing algorithm to adjust at least one of the variables based on the user input;

based on the adjusted at least one of the variables, repeating, assembling the model, receiving the model output for the model, and causing retransmission of the fulfillment data, based on the user input; and transmitting, by the processor, the fulfillment data to each fulfillment center to fill the complete order from the first batch of orders.

2. The method of claim 1, wherein the constraints include capacity limitations of each fulfillment center based on at least one of i) time constraint for shipping items; ii) operational resource availability at each fulfillment center; iii) inventory availability at each fulfillment center; iv) shipping capacity; (v) labor capacity and (vi) batch-specific variation to one or more of the foregoing.

3. The method of claim 1, wherein the constraints include i) a network capacity to ship a predetermined number of units and; ii) for each fulfillment center, an allocated fulfillment center capacity expressed as a portion of the predetermined number of units, and wherein assembling the model comprises applying a reallocation function directing a change to an allocation of orders among the fulfillment centers to keep the network within a predetermined total network unit volume.

4. The method of claim 3, wherein the reallocation function operates within a predetermined tolerance, is based on a total number of items shipped from each fulfillment center, and includes a cost function in combination with a mis-allocation cost function.

5. The method of claim 3, wherein the reallocation function directs a change to an allocation based on at least a predetermined allocation tolerance for each fulfillment center.

6. The method of claim 5, wherein the change to an allocation is further based on a maximum tolerance percentage for each fulfillment center measured as a percentage of a total network volume for the network of fulfillment centers.

7. The method of claim 6, wherein the maximum tolerance percentage varies by time of day.

8. The method of claim 1, wherein the constraints include an order fulfillment constraint that sum of quantities belonging to all packages shipped using any mode and delivered from all fulfillment centers equals an ordered quantity for each item.

9. The method of claim 1, wherein the constraints include an inventory availability constraint that quantity of an item from all packages shipped from any fulfillment center using any available mode is less than or equal to the available quantity in the fulfillment center.

10. The method of claim 1, wherein assembling the model comprises minimizing shipping costs for shipping each sub-package from each fulfillment center used to ship a product, wherein the shipping costs are based on weight of each item.

11. The method of claim 1, wherein assembling the model comprises minimizing total fulfillment time for all packages based on constraints for each package and for each customer, wherein fulfillment time is a time period that starts upon order creation for a package and ends upon completion of delivery for the package.

12. The method of claim 1, wherein assembling the model comprises minimizing order splits to ship all order items from a same fulfillment center.

13. The method of claim 1, wherein assembling the model comprises minimizing line-item splits caused by shipping a same SKU from two or more fulfillment centers.

14. The method of claim 1, wherein each order includes an order for at least one product from a menu of products.

15. The method of claim 1, wherein the routing objectives include allowing an order to be fulfilled by multiple fulfillment centers only if containing to model to limit fulfillment of the order to a single fulfillment center is not numerically solvable in a predetermined amount of time.

* * * * *